(12) United States Patent
Gonzalez et al.

(10) Patent No.: US 11,653,039 B2
(45) Date of Patent: May 16, 2023

(54) VIDEO STREAM BATCHING

(71) Applicant: AVA VIDEO SECURITY LIMITED, Middlesex (GB)

(72) Inventors: Sira Gonzalez, Middlesex (GB); Robert Welin, Middlesex (GB)

(73) Assignee: AVA VIDEO SECURITY LIMITED, Uxbridge (GB)

( * ) Notice: Subject to any disclaimer, the term of this patent is extended or adjusted under 35 U.S.C. 154(b) by 241 days.

(21) Appl. No.: 16/732,553

(22) Filed: Jan. 2, 2020

(65) Prior Publication Data
US 2020/0221142 A1 Jul. 9, 2020

(30) Foreign Application Priority Data
Jan. 4, 2019 (GB) ..................... 1900096

(51) Int. Cl.
*H04N 21/2343* (2011.01)
*H04N 21/24* (2011.01)

(52) U.S. Cl.
CPC ..... *H04N 21/2343* (2013.01); *H04N 21/2402* (2013.01)

(58) Field of Classification Search
CPC ........... H04N 21/2343; H04N 21/2402; H04N 7/181; H04N 21/2401; H04N 21/2662; H04N 21/433; H04N 21/44004; H04N 21/4435; H04N 21/4621; H04N 21/84; H04N 21/8456; H04N 7/18
See application file for complete search history.

(56) References Cited

U.S. PATENT DOCUMENTS

| 6,643,327 B1* | 11/2003 | Wang ................... H04N 19/162 |
| | | 375/E7.181 |
| 7,337,231 B1* | 2/2008 | Li ..................... H04N 21/47202 |
| | | 709/231 |
| 8,707,320 B2* | 4/2014 | Liddell .................. G06F 9/505 |
| | | 718/104 |
| 2009/0083279 A1* | 3/2009 | Hasek ............. H04N 21/21815 |

(Continued)

FOREIGN PATENT DOCUMENTS

| EP | 1 919 220 A2 | 5/2008 |
| EP | 2 782 281 A1 | 9/2014 |

OTHER PUBLICATIONS

Axis: "Latency in live network video surveillance", XP055680888, https://www.axis.com/files/whitepaper/wp_latency_live_netvid_63380_external_en_1504_lo.pdf (2015).

(Continued)

*Primary Examiner* — Nathan J Flynn
*Assistant Examiner* — Christine A Kurien

(57) ABSTRACT

A computer-implemented method, a system, a video camera, and a server all for dynamically batching a video stream from a video camera. The method comprising the steps of: capturing, by the video camera, a video stream; identifying two or more intended subscribers of the video stream, said subscribers connected to the video camera via the packet-switched network; determining a sensitivity to latency for each subscriber; batching the video stream into a plurality of batches, wherein the size of each batch of the plurality of batches is based on the subscriber determined to be most sensitive to latency; and transmitting the plurality of batches of the video stream to each subscriber.

20 Claims, 10 Drawing Sheets

(56) References Cited

U.S. PATENT DOCUMENTS

| | | | |
|---|---|---|---|
| 2011/0208872 A1 | 8/2011 | Liddell et al. | |
| 2013/0114744 A1* | 5/2013 | Mutton | H04N 19/177 |
| | | | 375/240.26 |
| 2013/0129317 A1* | 5/2013 | Moorer | H04N 21/8456 |
| | | | 386/241 |
| 2014/0328311 A1* | 11/2014 | Qiang | H04W 16/14 |
| | | | 370/329 |
| 2015/0149655 A1* | 5/2015 | Dingle | H04N 21/23439 |
| | | | 709/231 |
| 2015/0163532 A1* | 6/2015 | Shmueli | H04N 21/2747 |
| | | | 386/326 |
| 2015/0208103 A1* | 7/2015 | Guntur | H04N 21/23439 |
| | | | 725/61 |
| 2016/0227096 A1* | 8/2016 | Brav | H04N 21/21805 |
| 2016/0344781 A1* | 11/2016 | Gyimesi | H04L 65/612 |
| 2017/0201724 A1 | 7/2017 | Galvin et al. | |
| 2017/0280474 A1* | 9/2017 | Vesterinen | H04W 28/22 |
| 2018/0131979 A1* | 5/2018 | Bayoumi | G06F 9/5027 |
| 2019/0069004 A1* | 2/2019 | Badawiyeh | H04N 21/2383 |
| 2019/0199763 A1* | 6/2019 | Demirli | H04L 67/10 |
| 2020/0204841 A1* | 6/2020 | Van Brandenburg | |
| | | | H04N 21/85406 |
| 2020/0273268 A1* | 8/2020 | Bhattacharyya | H04W 4/40 |
| 2021/0092476 A1* | 3/2021 | Sivaramalingam | |
| | | | H04N 21/234318 |

OTHER PUBLICATIONS

Combined Search and Examination Report under Sections 17 and 18(3) dated Jun. 28, 2019 in GB1900096.7.

Extended European search report dated Apr. 7, 2020 in EP 19 21 8137.

* cited by examiner

VIDEO STREAM BATCHING

CROSS-REFERENCE TO RELATED APPLICATION

This application claims priority to Great Britain Application No. 1900096.7, filed Jan. 4, 2019, which is hereby incorporated by reference in its entirety for all purposes.

FIELD OF THE INVENTION

The present invention relates to a method of video stream batching, and a system, server, and video camera configured to perform same.

BACKGROUND

As the use of network enabled cameras increases, the demands placed on any given network also increase. Notably as more and more network enabled security cameras are in use, which may operate for 24 hours a day, the demands placed on a network increase substantially.

FIG. 1 shows the structure of a conventional video stream. The video stream can be broken down into one or more encoded video sequences. Each of these encoded video sequences can be independently decoded. An encoded video sequence can also be referred to as a group of pictures or GOP. The sequence generally starts with an intra-coded picture or I-frame, and then includes further frames (i.e. B and P frames). Sometimes there is a defined structure for the GOP, with the same structure being used repeatedly. On other cases, the GOP structure can vary. A GOP can represent several seconds of video playback.

Generally, video cannot be played back by decoding from an arbitrary point within a GOP, as the B or P frames reference other frames within the GOP before the start point. If the start point is an I-frame, then there are no references to earlier frames. Therefore the retrieval of all data within the GOP can be necessary even when playback is to be started part way through the GOP.

These demands on a network generally take two forms: (i) storage of the video streams from each camera; and (ii) transmission of the video streams from each camera across the network. The transmission of video streams through a network is generally limited by the time taken to process the data as it received in any given node of the network.

The time required to process video data typically depends on two factors: the amount of data, and the number of pieces of data that need to be processed. Processing the same amount of data which has been split into more pieces is more expensive than if that data was in fewer pieces. This is due to having to make fewer decisions regarding the nature of the data, and therefore how it needs to be handled. It also reduces the number of calls to memory functions and, further, reduces the per-piece overhead.

When storing and retrieving data, the same factors can apply. Writing and reading larger pieces of data reduces the number of filesystem calls, which affects the time required to write or read the data. Also, larger pieces of data can reduce the amount of storage required if there is an associated "per-piece" storage overhead for the data (for example, metadata).

However, reducing the number of pieces of data can increase latency. This is because the data initially received at any given node must be buffered and wait for subsequent data, and it is therefore not available for downstream processing. The amount of latency will depend on how long the data must wait before being batched.

There is need then to provide efficient storage and transmission of video data across a network, whilst mitigating the effects of latency.

SUMMARY

Accordingly, in a first aspect, the invention provides a computer-implemented method of dynamically batching a video stream from a video camera, said video camera connected to a packet-switched network; the method comprising the steps of: capturing, by the video camera, a video stream; identifying one or more intended subscribers of the video stream, said subscribers connected to the video camera via the packet-switched network; determining a sensitivity to latency for the or each subscriber; batching the video stream into a plurality of batches, wherein the size of each batch of the plurality of batches is based on the subscriber determined to be most sensitive to latency; and transmitting the plurality of batches of the video stream to the or each subscriber.

Advantageously, data comprising the video stream can be batched in a manner which: reduces overhead storage, as when possible the data can be batched in larger volumes; and does not incur unacceptable latency to subscribers of the video stream. Accordingly, a computer on which the method is running operates more efficiently and effectively as a computer.

Optional features of the invention will now be set out. These are applicable singly or in any combination with any aspect of the invention.

There may be at least two subscribers, connected to the video camera via the packet-switched network.

Determining the sensitivity to latency may include identifying a type of subscriber. The types of subscriber may include: a streamer (e.g. a display device for showing a stream of the video stream), a storer (e.g. a storage device for storing the video stream), and an analyser (e.g. a processor for analysing content of the video stream). Generally, a streamer is the most sensitive to latency, whereas a storer is the least. An analyser generally lies between a storer and a streamer in terms of sensitivity.

When at least one subscriber is determined to be a streamer of the video stream, the video stream may be batched at an individual frame level. Accordingly, the streamer does not encounter unacceptable latency when streaming and viewing the video stream.

When all subscribers are determined to be storers of the video stream, the video stream may be batched at a group-of-pictures level. Thus, the storage overhead of the video stream is optimised.

When at least one subscriber is determined to be a video analyser and no subscribers are determined to be streamers of the video stream, the video stream may be batched at a level between an individual frame level and a group-of-pictures level. Therefore, the video analyser receives batches at an appropriate rate whilst the storage overhead of the video stream is reduced.

In some examples, the video stream may be rebatched at the or each storer of the video stream regardless as to whether it was batched upstream of the or each storer. Whilst this may increase the processing cost at the or each storer, it can ensure that the final storage overhead is low. For example, if the video stream is initially batched at an individual frame level (so that any streamers do not encounter unacceptable latency), it may be rebatched at the or each storer to a group-of-pictures level.

The video camera may be connected to a server, and the server may perform the step of determining the sensitivity to latency for each subscriber.

The video camera may send the captured video stream to the server, and the server may perform the step of batching the video stream and transmitting the plurality of batches of the video stream to each subscriber.

A processor within the video camera may perform the step of batching the video stream. The video camera may send the plurality of batches of the video stream to the server.

In a second aspect, the invention provides a system configured to dynamically batch a video stream, the system comprising: a video camera, connected to a packet-switched network; a server connected to the camera via the packet-switched network; and one or more subscribers, connected to the server via the packet-switched network; wherein the video camera is configured to capture a video stream, and transmit said video stream to the server, and wherein the server is configured to transmit said video stream to the one or more subscribers; and wherein either or both of the video camera and the server are configured to perform one or more of the following steps: determine a sensitivity to latency for the or each subscriber; batch the video stream into a plurality of batches, wherein the size of each batch of the plurality of batches is based on the subscriber determined to be most sensitive to latency; and transmit the plurality of batches of the video stream to the or each subscriber.

The system of the second aspect may be configured to perform any, or insofar as they are compatible, any combination of the optional features of the method of the first aspect.

There may be at least two subscribers, connected to the server via the packet-switched network.

Determining a sensitivity to latency may include identifying a type of subscriber. The types of subscriber may include: a streamer (e.g. a display device for showing a stream of the video stream), a storer (e.g. a storage device for storing the video stream), and an analyser (e.g. a processor for analysing content of the video stream). Generally, a streamer is the most sensitive to latency, whereas a storer is the least. An analyser generally lies between a storer and a streamer in terms of sensitivity.

When at least one subscriber is determined to be a streamer of the video stream, the video stream may be batched at an individual frame level. Accordingly, the streamer does not encounter unacceptable latency when streaming and viewing the video stream.

When all subscribers are determined to be storers of the video stream, the video stream may be batched at a group-of-pictures level. Thus, the storage and processing overhead of the video stream is optimised.

When at least one subscriber is determined to be a video analyser and no subscribers are determined to be streamers of the video stream, the video stream may be batched at a level between an individual frame level and a group-of-pictures level. Therefore, the video analyser receives batches at an appropriate rate whilst the storage overhead of the video stream is reduced.

The server may perform the step of determining a sensitivity to latency for each subscriber. The video camera may be configured to send the captured video stream to the server, and the server may be configured to perform the step of batching the video stream and transmitting the plurality of batches of the video stream to each subscriber.

A processor within the video camera may be configured to perform the step of batching the video stream. The video camera may be configured to receive, from the server, data indicating a subscriber most sensitive to latency.

In a third aspect, the invention provides a video camera configured to dynamically batch a video stream, said video camera being connected to one or more subscribers via a packet-switched network, wherein the video camera is configured to: capture a video stream; determine a sensitivity to latency for the or each subscriber; batch the video stream into a plurality of batches, wherein the size of each batch of the plurality of batches is based on the subscriber determined to be most sensitive to latency; and transmit the plurality of batches of the video stream to the or each subscriber.

There may be at least two subscribers, connected to the camera via the packet-switched network.

Determining a sensitivity to latency for each subscriber may include receiving, from a server, a sensitivity to latency for each subscriber. The video camera may be configured to transmit the plurality of batches of the video stream to each subscriber via a server.

The video camera of the third aspect may be configured to perform any, or insofar as they are compatible, any combination of the optional features of the method of the first aspect.

In a fourth aspect, the invention provides a server, configured to dynamically batch a video stream from a video camera, the server being connectable to the video camera and one or more subscribers via a packet-switched network, wherein the server is configured to: receive, from the video camera, a captured video stream; determine a sensitivity to latency for the or each subscriber; batch the captured video stream into a plurality of batches, wherein the size of each batch of the plurality of batches is based on the subscriber determined to be most sensitive to latency; and transmit the plurality of batches of the video stream to the or each subscriber The server of the fourth aspect may be configured to perform any, or insofar as they are compatible, any combination of the optional features of the method of the first aspect.

There may be at least two subscribers, connectable to the server via the packet-switched network.

In a fifth aspect, there is provided a computer-implemented method of storing a video stream from a video camera, said video camera connected to a packet-switched network; the method comprising the steps of: (a) receiving, at a storage device connected to the packet-switched network, the video stream in the form of a stream of data packets; and (b) determining whether a received data packet is associated with, and fits into, an existing buffer for data packets, and if so: (i) inserting the received data packet into the buffer; and if not (ii) writing the existing buffer to permanent storage of the storage device together with metadata associated with the buffer, and inserting the received data packet into a new buffer.

Advantageously, this can ensure that regardless of how the stream of data packets has been batched upstream of the storage component, it is always batched at a level which minimises storage overhead.

A received packet may be associated with the existing buffer if the received data packet belongs to the same group-of-pictures of encoded video sequence as data packets stored in the existing buffer.

In a sixth aspect, there is provided a computer-implemented method of buffering a video stream from a video camera, said video camera connected to a packet-switched network; the method comprising the steps of: receiving, at a node of the packet-switched network, the video stream in the form of a stream of data packets; buffering the stream of data packets into one or more buffers; transmitting the stream of data packets on to one or more subscribers of the video stream; and, in response to a new subscriber subscribing to the video stream transmitting the contents of the one or more buffers to the new subscriber from the node.

Advantageously, new subscribers to the video stream can quickly receive the video stream.

In one example, the stream of data packets transmitted to the one or more subscribers may be those buffered in the one or more buffers i.e. sent on after buffering. In another example, the stream of data packets transmitted to the one or more subscribers may be those received by the node but not buffered i.e. the buffered data packets are a copy of the received ones.

The computer-implemented method of the sixth aspect may further comprise the steps of: clearing or deleting the one or more buffers when it is determined that the one or more buffers contains a complete group-of-pictures or encoded video sequence which has been transmitted to the one or more subscribers, and buffering newly received data packets of the stream of data packets into the one or more buffers.

The node may be a receiver, connected at a boundary of the packet-switched network.

The contents of the buffer may be marked as a retransmission when transmitted to the new subscriber.

Further aspects of the present invention provide: a computer program comprising code which, when run on a computer, causes the computer to perform the method of the first, fifth, or sixth aspect; a computer readable medium storing a computer program comprising code which, when run on a computer, causes the computer to perform the method of the first, fifth, or sixth aspect; and a computer system programmed to perform the method of the first, fifth, or sixth aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
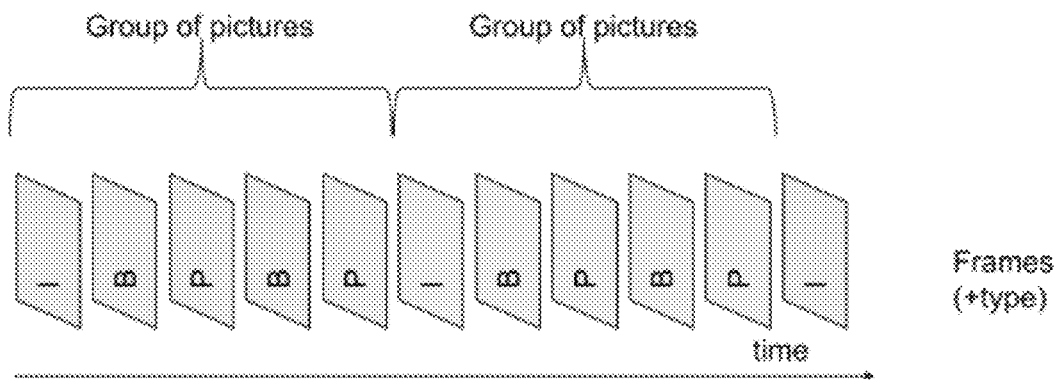
FIG. 1 shows an example encoded video sequence.
Figure 2:
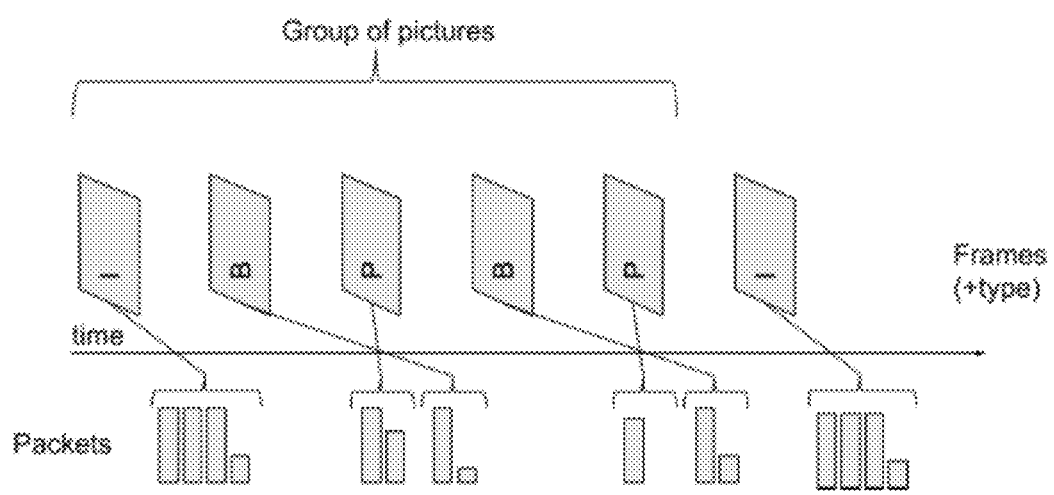
FIG. 2 shows the division of an encoded video sequence into packets.

FIG. 2 shows the division of an encoded video sequence, in this case a group of pictures, into packets. An individual frame of a video stream generally consists of multiple packets and, as discussed previously, a group of pictures or encoded video sequence typically has more than one frame. Given the different encoding efficiencies for I vs B and P frames, each frame may have a different number of packets, and some frames may only be a single packet. It is useful to note that the order that packets are sent may not be the same as the order of the frames they refer to.

The packets of the video stream are transmitted over a packet network, and received by subscribers or components which process the data in some manner. The subscribers are generally one of the following three types: 1—Storer, which stores the video stream in medium or long term storage (for example hard disk drive) for later retrieval; 2—Analyser, which analyses the video stream (for example, to identify objects of interest); and 3—Streamer, which presents the video stream for viewing (e.g. by sending the data to an application or browser which displays the video).

A storer is the least sensitive to latency, whereas the live viewer/streamer is the most sensitive to latency. Latency is incurred, in part, by batching the received packets into one or more batches. From a storage perspective it is preferable that the packets of the video stream are batched such that the size of each batch is large (e.g. on the order of hundreds of kilobytes). This is so less metadata is stored, as fewer batches means less metadata. However, batching at a large size incurs additional latency as a processor performing the batching must wait for subsequent packets to arrive before the batch can be transmitted downstream.

Figure 3:
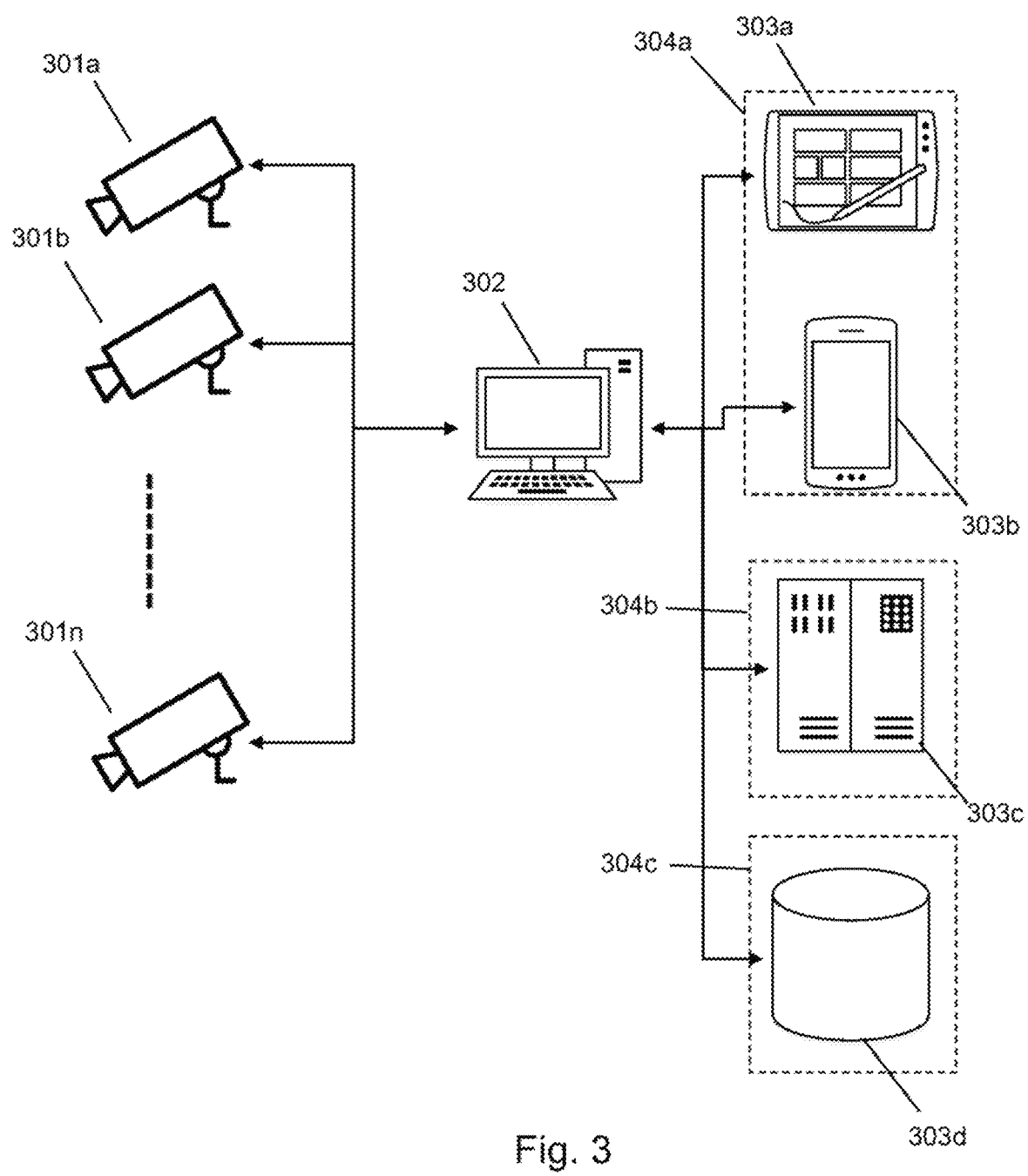
FIG. 3 shows a system.

FIG. 3 shows an example system. Broadly, the system has a number of video cameras 301*a*-301*n*, which are network enabled and preferably are security cameras. Each video camera is connected via a packet-switched network to a server 302 and transmits a corresponding video stream thereto. The server acts as a hub to facilitate the communication of each video stream to its corresponding subscriber(s).

For example, the server 302 is in this example is connected to subscribers 303*a*-303*d*. Subscriber 303*a*, a tablet pc, and subscriber 303*b*, a smart phone, are streamers and so are the most sensitive to latency. This is indicated by the dotted box 304*a*, which demarks these subscribers as belonging to a class of subscribers having the same level of sensitivity to latency. In contrast, computer 303*c* is an analyser, and so belongs to a different class of subscribers 304*b*. This class 304*b* is less sensitive to latency than class 304*a*. Finally, database 303*d* is a storer, and so belongs to a yet further class of subscribers 304*c*. This class 304*c* is the least sensitive to latency of the three discussed.

Figure 4:
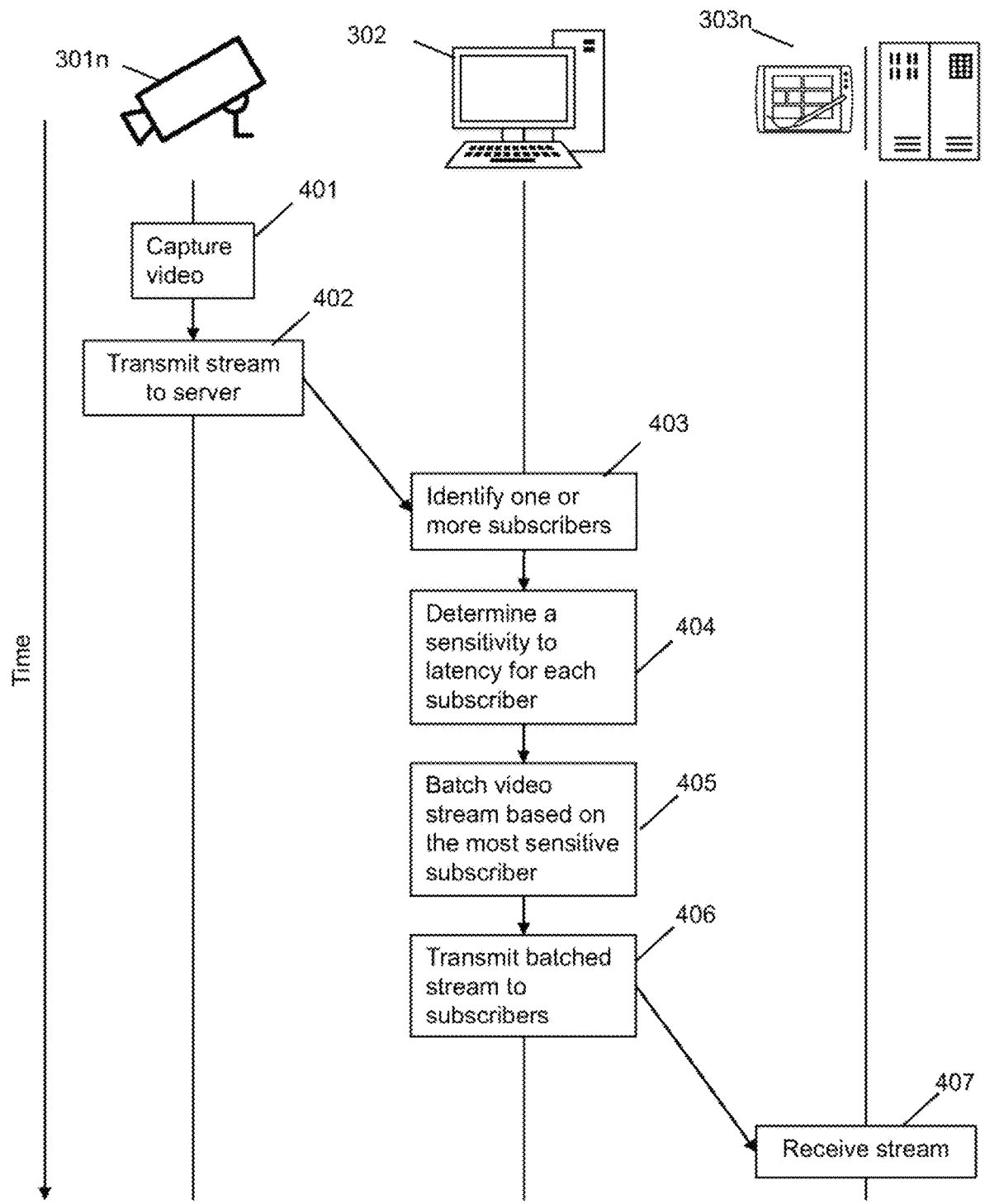
FIG. 4 is a network flow diagram.

FIG. 4 shows a network flow diagram. In a first step 401, a video stream is captured by a given video camera 301*n*. Next, in this example, the video stream is transmitted via conventional packet batching methods in step 402 to the server 302.

Having received this video stream, the server 302 then, in step 403, identifies one or more subscribers of the video stream. This step may be performed before the video stream is transmitted to the server, for example on a system setup or in response to a new subscriber registering with the server. Once the subscribers are identified, the server then determines a sensitivity to latency for each subscriber in step 404.

Next, the server batches the video stream based on the most sensitive subscriber in step 405. For example, if the server determines that all subscribers are storers, then the server may batch the video stream at a group of pictures level. In contrast, if the server determines that at least one subscriber is a streamer, the server may batch the video stream at a frame level.

After the video stream has been batched, it is transmitted in step 406 to the or each subscriber 303n which receives the stream in step 407.

The process of receiving, batching, and transmitting repeats for as long as: (i) the video camera is capturing video and transmitting the video stream to the server; and (ii) there is at least one subscriber to the video stream. The server may re-determine the level at which the video stream is being batched in response to a new subscriber registering with the server.

In this example the server 302 performs steps 403-406. However, in other examples, the or each video camera 301n is configured to perform these steps. In such examples, the or each video camera may transmit the batched stream directly to each subscriber or may transmit the batched video stream to the server for subsequent distribution.

Figure 5:
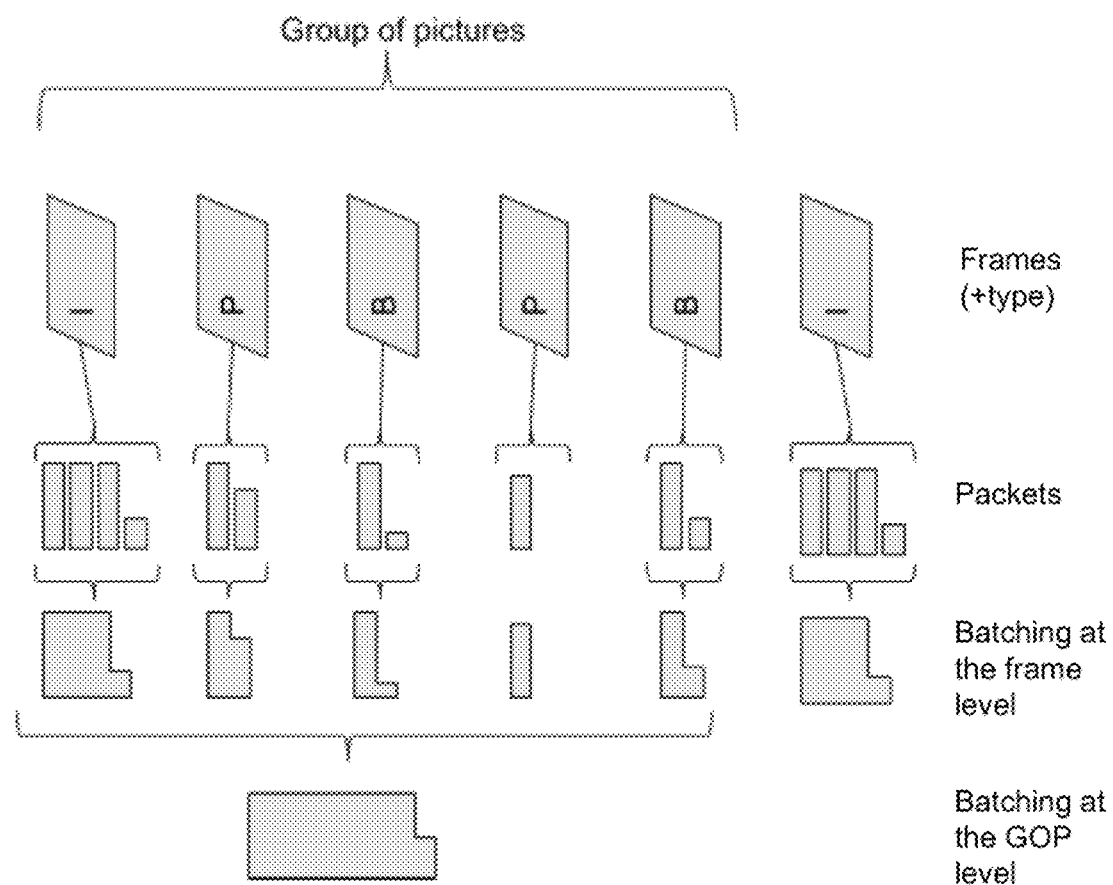
FIG. 5 illustrates various levels of batching of a video stream.

FIG. 5 shows the various levels of batching either each video camera or the server can operate at. Each frame, comprising at least one packet, can be batched either at the frame level or at group of picture level, or a level in between these two. For example, fixed sized batching, where packets comprising two or more frames can be combined until the batch reaches a predetermined size. Another example is to batch at a video codec NALU (network abstraction level unit) level i.e. combining fragmented NALUs. A further example would be to batch at a rate of n frames, where n is greater than 1 but less than a whole group of pictures.

Figure 6:
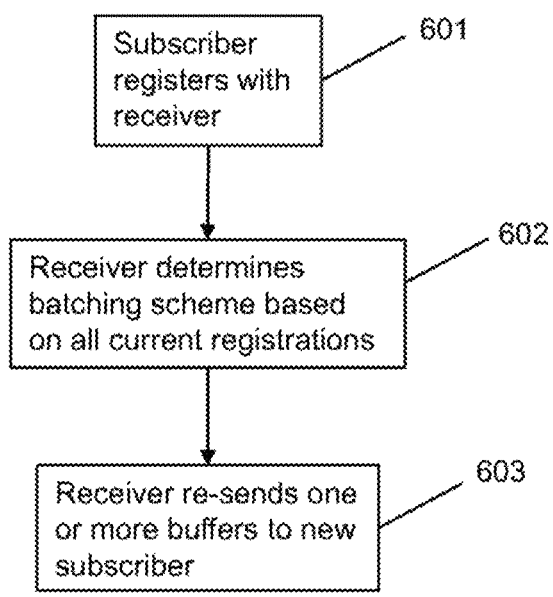
FIG. 6 shows a method of registering a new subscriber.

FIG. 6 shows a method of registering a new subscriber. In a first step, 601, the subscriber registers with a receiver. The receiver may be either the server or a video camera, and the subscriber may register with it by sending a registration message.

Subsequently, in step 602, the receiver determines which batching scheme to operate based on all current registrations. As has been discussed previously, this may mean moving to a more granular level of batching if the new subscriber is more sensitive to latency than any of the previously registered subscribers.

Next, in optional step 603, the receiver re-sends one or more buffers to the new subscriber. The server or video camera can, in some examples, retain in a buffer all batches or packets relating to a single group of pictures or encoded video sequence. Thus, in response to a new subscriber, the server or video camera can transmit all batches or packets pertaining to that group of pictures or encoded video sequence, and the subscriber can quickly start receiving the video stream without needing to retrieve data from a storage component or wait for a new group of pictures or encoded video sequence to start. In doing so, the server or video camera may mark this buffer as a retransmission, so that other subscribers are able to determine that it includes duplicated (relative to them) data.

Figure 7:
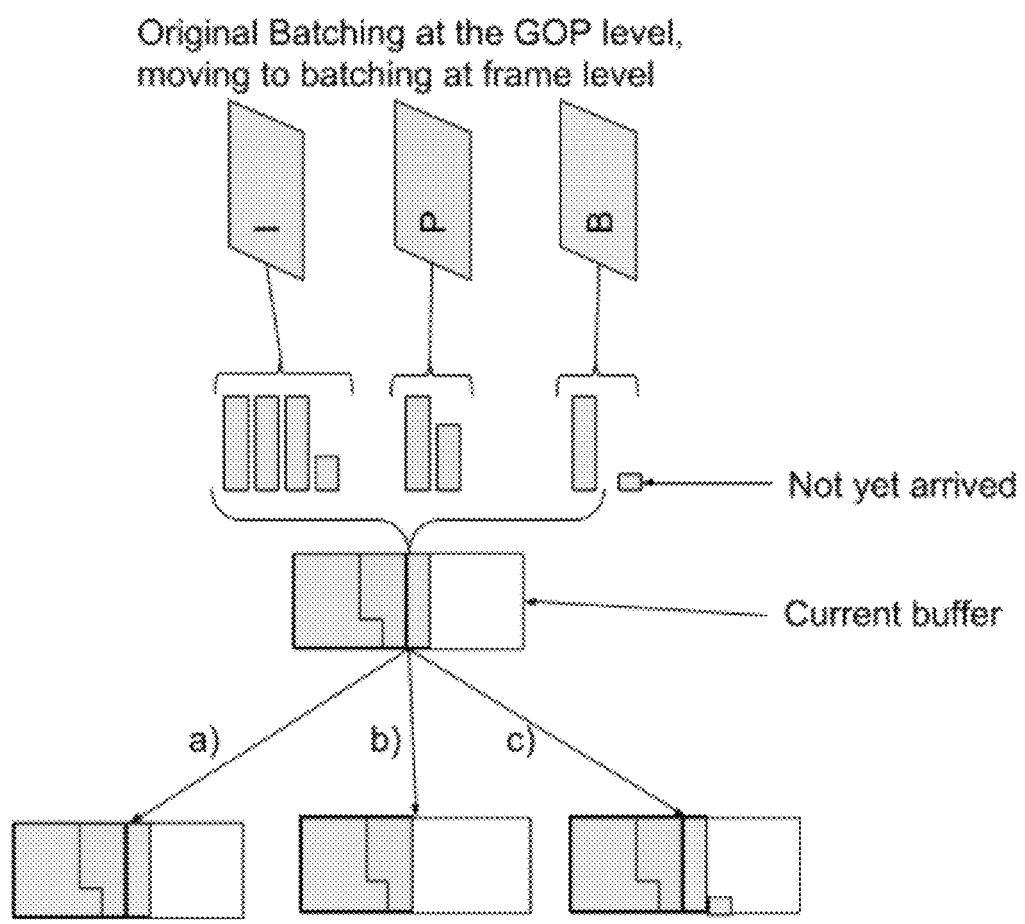
FIG. 7 shows a transition from batching at a group of pictures level to a more granular level.

As a result of a determination that the batching mode must change to a more granular level of batching, the server or video camera can either: a) send all of the buffers it has currently; b) determine the start boundary of the current item in the new mode and send all data up to that point; or c) wait for the end of the data corresponding to an item in the new mode. This is shown in FIG. 7, where the batching mode moves from a batching at GOP level to a batching at individual frame level.

Figure 8:
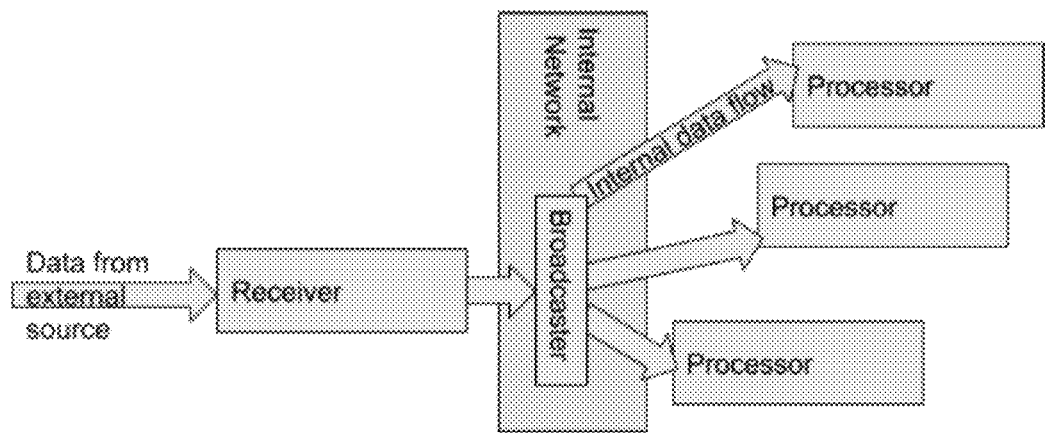
FIG. 8 shows an example single node network.

FIG. 8 shows an example of a single node network. Data (e.g. a video stream) is received from some external source, e.g. a video camera, to a receiver. The receiver may be, for example, a hub, packet switch, or part of a server. The receiver then sends this data on to the broadcaster of an internal network. The broadcaster may be, for example, a server connected to the hub or packet switch, or a separate part of the same server containing the receiver. The broadcaster acts as a node for all processors (e.g. subscribers) which receive the data. In an alternative example, the data is transmitted directly from the receiver to each processor.

Figure 9:
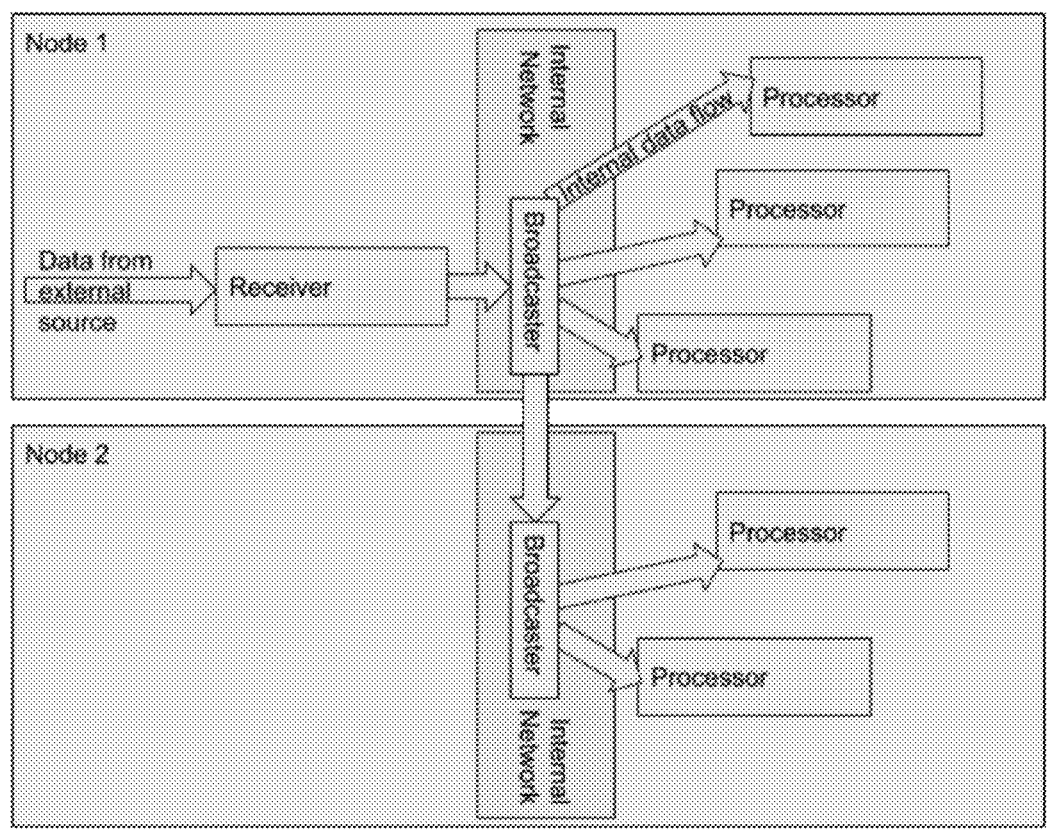
FIG. 9 shows an example multi-node network.

In contrast, a multi-node network is shown in FIG. 9. However data is still received at a single receiver within node 1. In this example, only a single copy of the data is sent to any remote node with one or more processors. This avoids duplication of data.

One of the potential processors in the network is a storage component. The storage component can batch data and store it to disk. It should be noted that if the input to the storage component is already batched, as has been discussed above, then copying the data into a buffer can be optimised out.

In many cases the batch is only a single buffer, and the buffer can be extended to contain all necessary information. Alternatively, more than one buffer can be used.

Figure 10:
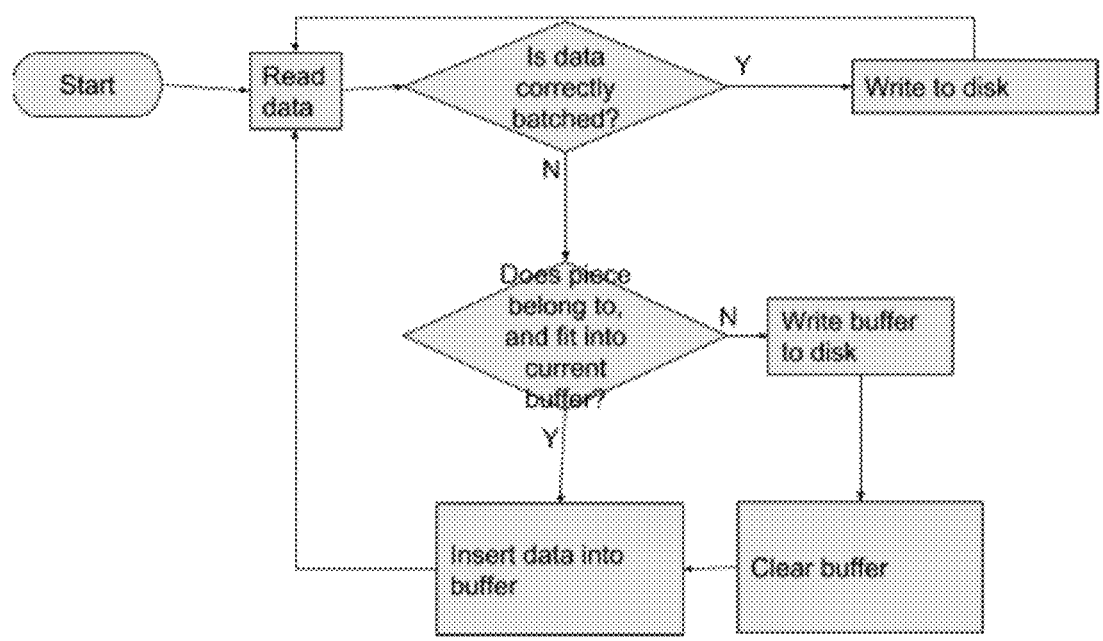
FIG. 10 is a flow diagram showing a method of batching data.

FIG. 10 is a flow diagram showing a method of batching data which can be performed by the storage component. In a first step, received data is read and it is determined whether the data has been correctly batched (e.g. has it been previously batched upstream of the storage component to a group-of-pictures level). If it has ("Y" in the figure), the data is written directly to disk.

If it has not ("N" in the figure), it is then determined whether the piece of data currently considered belongs to and fits into the current buffer. If it does not, the current buffer is written to disk and subsequently cleared. The piece of data can then be inserted into the buffer. If it does, the piece of data is inserted into the current buffer.

After the piece of data has been written to the buffer, the method returns to the first step of reading the data.

This approach reduces the storage overhead, as metadata is only stored once per buffer, rather than once per packet. When the whole batch fits inside a single buffer this is most optimal.

Figure 11:
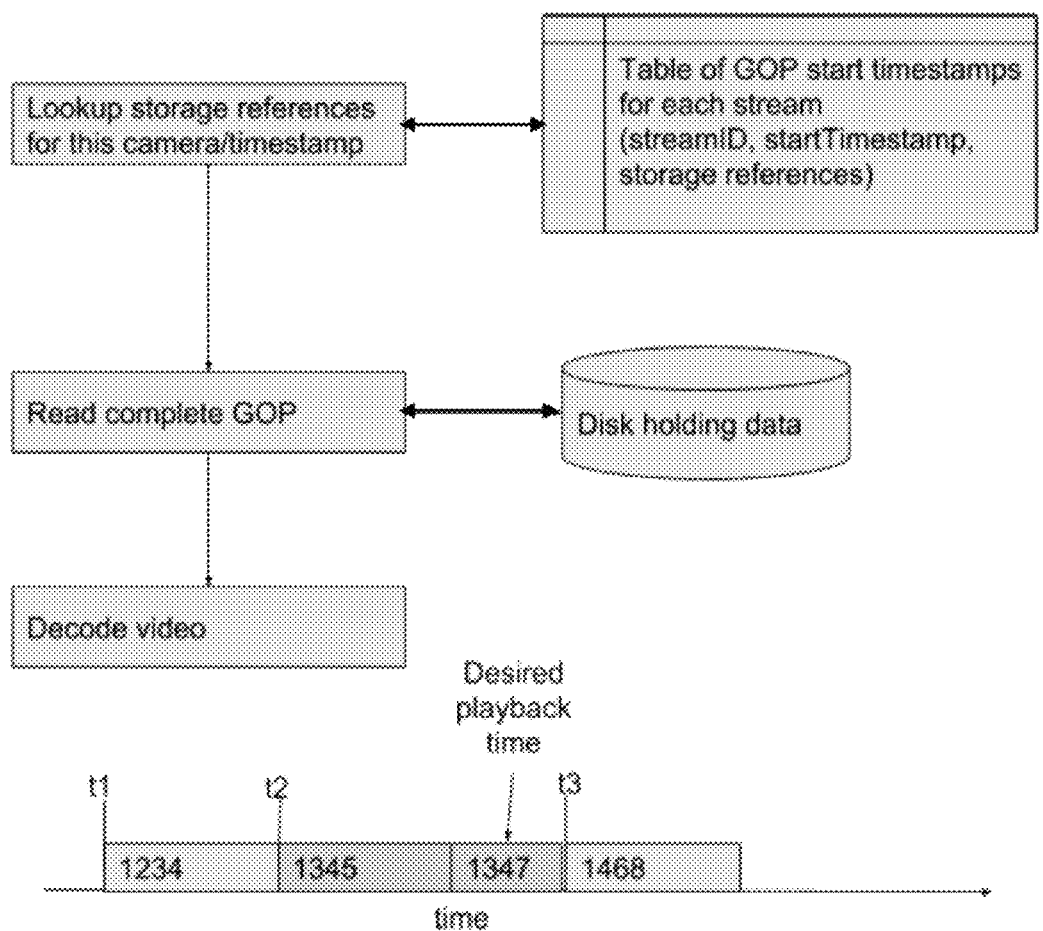
FIG. 11 shows a method of playing back stored video.

This approach also optimises playback, since the data required can more easily be found, as shown in FIG. 11. Assuming that the stream wanting to be played, and the time for the playback are known, the system can:
1. Determine the first GOP based on the GOP start times (e.g. highlighted GOP since $t_2 \leq t < t_3$)
2. Determine the storage references associated with this GOP (1345 and 1347 in FIG. 10);
3. Read the buffers from the storage by using those references; and
4. Decode the video.

Figure 12:
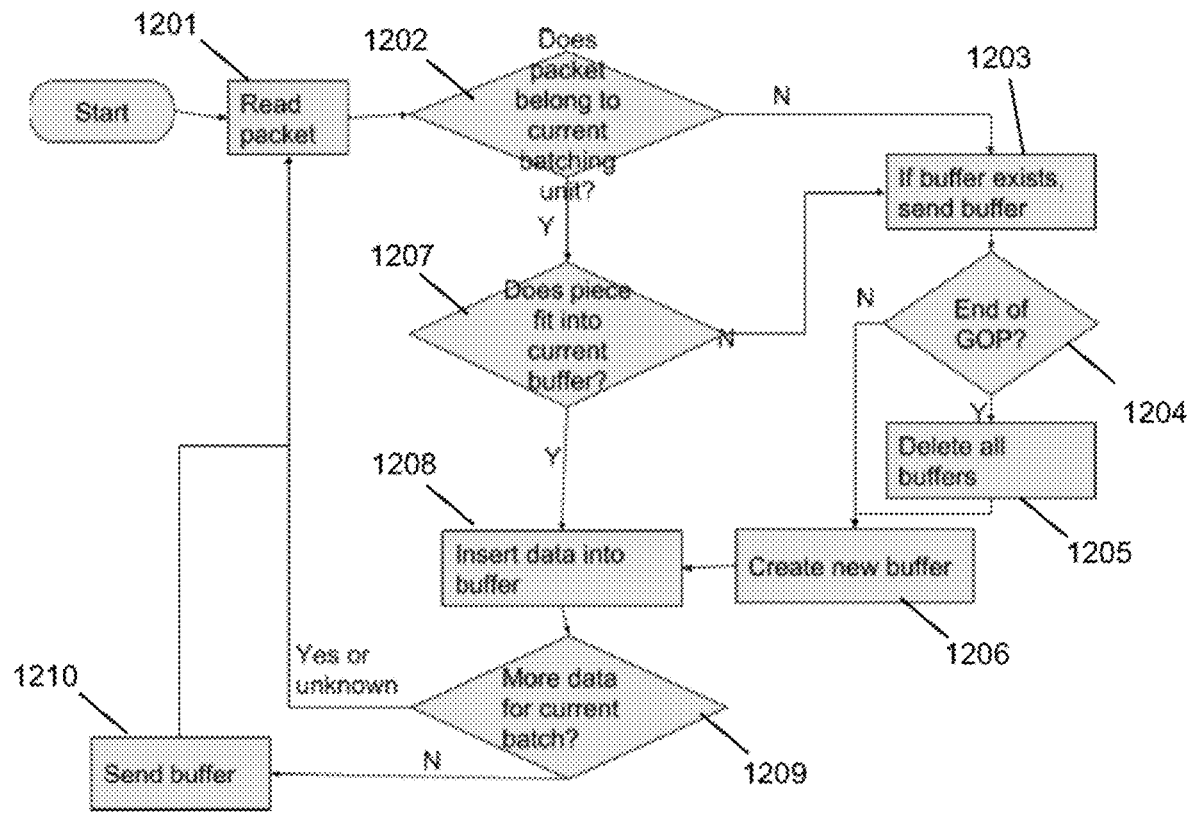
FIG. 12 is a flow diagram showing a method of batching data.

FIG. 12 is a flow diagram showing a method of batching data. Broadly, the receiver batches incoming packets until either the next packet does not fit into the existing buffer, or that all data for a single unit in the current batching mode is present. It should be noted that the ability to determine that all data for a batch has been received can depend on the batch type. However in cases where it is known it is not necessary to wait for the next packet to be received before sending the batch. This can further reduce latency.

In more detail, the method begins by reading the packet received 1201. A determination 1202 is then made as to whether the packet belongs to the current batching unit (according to the current batching mode). If not, the receiver sends the buffer 1203 (if it exists). Subsequently, a determination 1204 is made as to whether the end of the group of pictures has been reached. If so, all buffers are destroyed 1205 and a new buffer 1206 is created. If not, a new buffer is created 1206 without destroying the previous buffers (for the fast start procedure discussed previously). Next, the data is inserted into the buffer 1208.

If, during the determination 1202 was that the packet does belong to the current batching unit, a determination 1207 is made as to whether the piece of data fits into the current buffer. If not, steps 1203-1206 are performed. If so, the data is inserted into the buffer in step 1208.

After the data has been inserted into the buffer, a determination 1209 is made as to whether more data exists for the current batch. If so, or if it is unknown, the method returns to step 201 and further packets are read. If not, the buffer is sent in step 1210.

Figure 13:
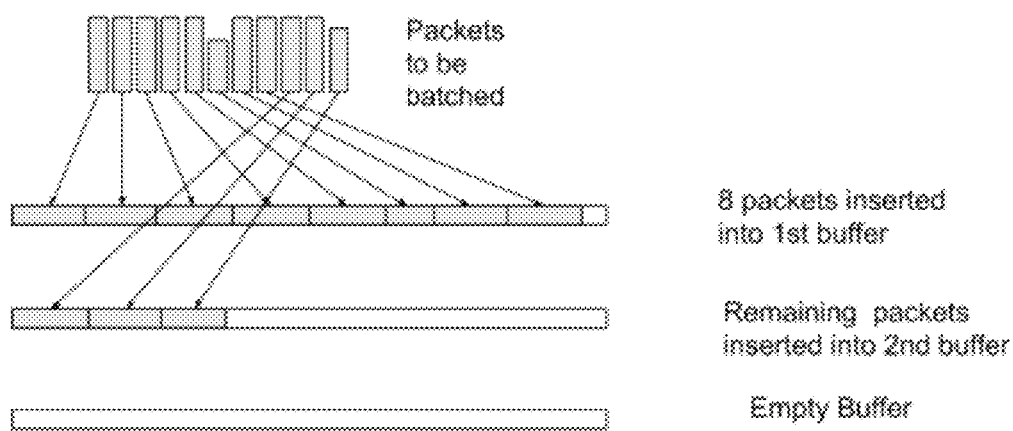
FIG. 13 shows packets batched according to the method shown in FIG. 12.

FIG. 13 shows packets batched into batches (i.e. buffers) according to the method of FIG. 12.

Figure 14:
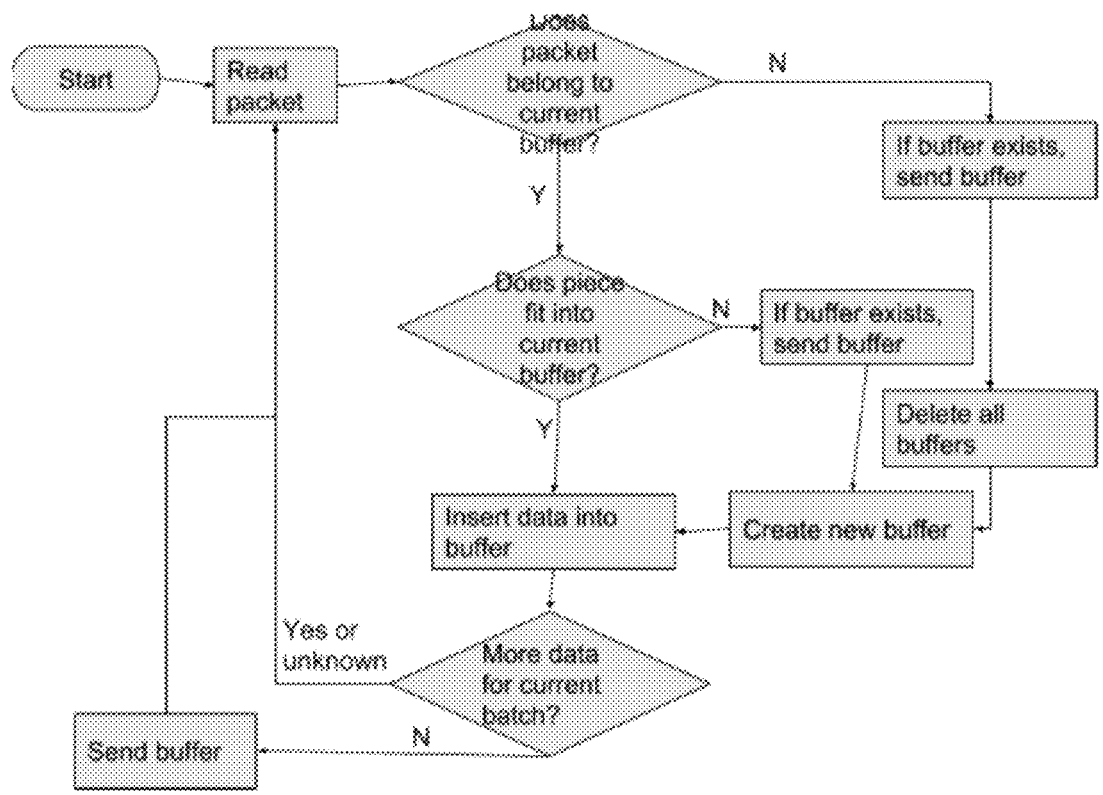
FIG. 14 is a flow diagram showing a variant method of batching data.
Figure 15:
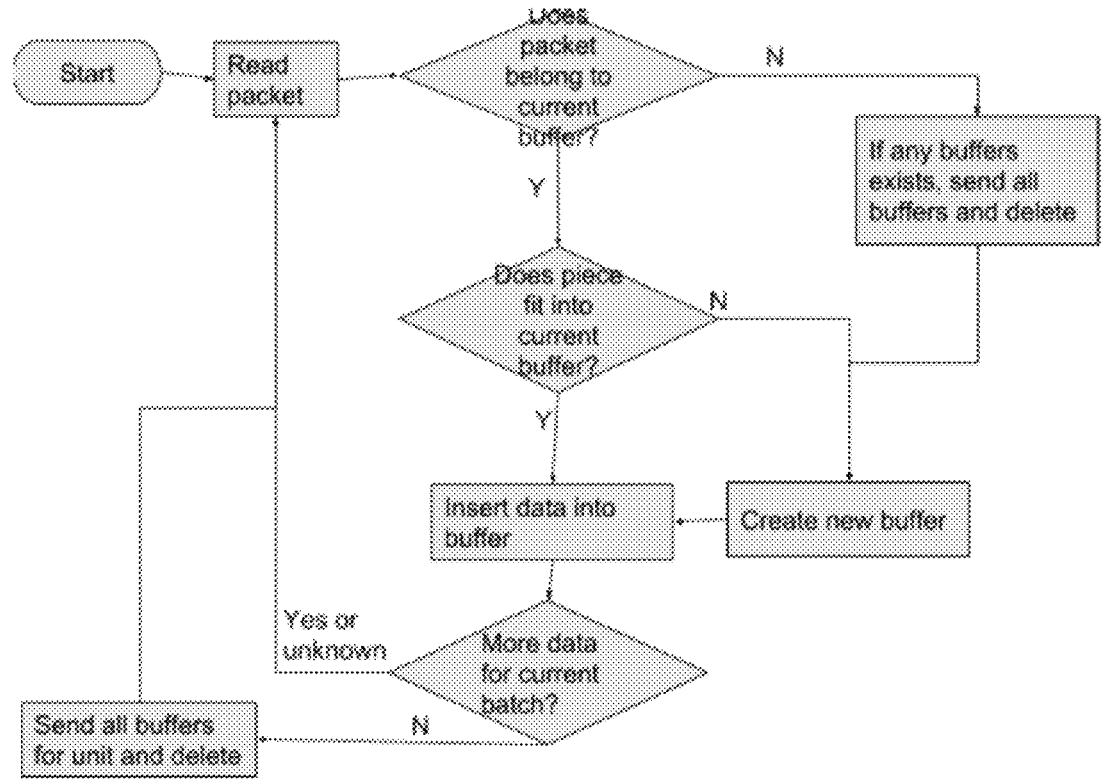
FIG. 15 is a flow diagram showing a further variant method of batching data.

FIG. 14 shows a variant method of batching, where buffers are sent immediately after being filled. The deletion of buffers may occur at fixed time intervals. FIG. 15 shows a variant method of batching where buffers are not sent until the whole unit is buffered. This may add latency, and also may require deleting the buffer after the unit is sent. In this variant, the fast-start procedure may still function is the current batching mode is at the group of picture level.

Further, and optionally, the receiver does not destroy buffers until all data for a single GOP has been sent. This can facilitate the fast-start procedure discussed previously. If this fast-start procedure is not to be used, then buffers can be destroyed after being sent. Note that destroy in this context may refer to decrementing a reference count on that buffer.

Whilst the discussions above have focused on video stream data, the method and systems may also be applicable to other types of data. For example, audio data received by one or more microphones. It may also be possible to group different types of data together, for example batching both video and audio data as well as some analytical data (e.g. metadata).

Batching could also be performed between the receiver (e.g. the server or video camera) and the processor, by a further component.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A computer-implemented method of dynamically batching a video stream from a video camera, said video camera connected to a packet-switched network; the method comprising the steps of:
   capturing, by the video camera, a video stream;
   identifying two or more intended subscribers of the video stream, said subscribers connected to the video camera via the packet-switched network;
   determining a sensitivity to latency for each subscriber of the two or more intended subscribers;
   batching the video stream into a plurality of batches, wherein the size of each batch of the plurality of batches is based on only one subscriber type of the two or more intended subscribers that is determined to be most sensitive to latency; and
   transmitting the plurality of batches of the video stream to each subscriber of the two or more intended subscribers.

2. The computer-implemented method of claim 1, wherein determining a sensitivity to latency includes identifying a type of subscriber.

3. The computer-implemented method of claim 1, wherein when at least one subscriber is determined to be a streamer of the video stream, the video stream is batched at an individual frame level.

4. The computer-implemented method of claim 1, wherein when all subscribers are determined to be storers of the video stream, the video stream is batched at a group-of-pictures level.

5. The computer-implemented method of claim 1, wherein when at least one subscriber is determined to be a video analyser and no subscribers are determined to be streamers of the video stream, the video stream is batched at a level between an individual frame level and a group-of-pictures level.

6. The computer-implemented method of claim 1, wherein the video camera is connected to a server, and wherein the server performs the step of determining the sensitivity to latency for each subscriber.

7. The computer-implemented method of claim 6, wherein the video camera sends the captured video stream to the server, and the server performs the step of batching the video stream and transmitting the plurality of batches of the video stream to each subscriber.

8. The computer-implemented method of claim 1, wherein a processor within the video camera performs the step of batching the video stream.

9. The computer-implemented method of claim 8, wherein the video camera sends the plurality of batches of the video stream to a server.

10. A system configured to dynamically batch a video stream, the system comprising:
    a video camera, connected to a packet-switched network;
    a server connected to the camera via the packet-switched network; and
    two or more subscribers, connected to the server via the packet-switched network;
    wherein the video camera is configured to capture a video stream, and transmit said video stream to the server, and wherein the server is configured to transmit said video stream to the two or more subscribers; and
    wherein either or both of the video camera and the server are configured to perform one or more of the following steps:
        determine a sensitivity to latency for each subscriber of the two or more subscribers;
        batch the video stream into a plurality of batches, wherein the size of each batch of the plurality of batches is based on only one subscriber type of the two or more subscribers that is determined to be most sensitive to latency; and transmit the plurality of batches of the video stream to each subscriber of the two or more subscribers.

11. The system of claim 10, wherein determining a sensitivity to latency includes identifying a type of subscriber.

12. The system of claim 10, wherein when at least one subscriber is determined to be a streamer of the video stream, the video stream is batched at an individual frame level.

13. The system of claim 10, wherein when all subscribers are determined to be storers of the video stream, the video stream is a batched at a group-of-pictures level.

14. The system of claim 10, wherein when at least one subscriber is determined to be a video analyser and no subscribers are determined to be streamers of the video stream, the video stream is batched at a level between an individual frame level and a group-of-pictures level.

15. The system of claim 10, wherein the server performs the step of determining a sensitivity to latency for each subscriber.

16. The system of claim 15, wherein the video camera is configured to send the captured video stream to the server, and the server is configured to perform the step of batching the video stream and transmitting the plurality of batches of the video stream to each subscriber.

17. The system of claim 10, wherein a processor within the video camera is configured to perform the step of batching the video stream.

18. A video camera configured to dynamically batch a video stream, said video camera being connected to two or more subscribers via a packet-switched network, wherein the video camera is configured to:
  capture a video stream;
  determine a sensitivity to latency for each subscriber of the two or more subscribers;
  batch the video stream into a plurality of batches, wherein the size of each batch of the plurality of batches is based on only one subscriber type of the two or more subscribers that is determined to be most sensitive to latency; and
  transmit the plurality of batches of the video stream to each subscriber of the two or more sub scribers.

19. The video camera of claim 18, wherein determining a sensitivity to latency for each subscriber includes receiving, from a server, a sensitivity to latency for each subscriber.

20. A server, configured to dynamically batch a video stream from a video camera, the server being connectable to the video camera and two or more subscribers via a packet-switched network, wherein the server is configured to:
  receive, from the video camera, a captured video stream;
  determine a sensitivity to latency for each subscriber of the two or more subscribers;
  batch the captured video stream into a plurality of batches, wherein the size of each batch of the plurality of batches is based on only one subscriber type of the two or more subscribers that is determined to be most sensitive to latency; and
  transmit the plurality of batches of the video stream to each subscriber of the two or more subscribers.

* * * * *